US012561327B1

(12) United States Patent
Kuruganthy et al.

(10) Patent No.: US 12,561,327 B1
(45) Date of Patent: Feb. 24, 2026

(54) METHOD AND SYSTEM FOR AUTOMATIC RESPONSE TO CUSTOMER REQUESTS USING ARTIFICIAL INTELLIGENCE MODELS

(71) Applicant: JPMorgan Chase Bank, N.A., New York, NY (US)

(72) Inventors: Ravi Kuruganthy, Frisco, TX (US); Venkata Mohit Tamanampudi, New Castle, DE (US); Jayaprakash Moses, Greenville, DE (US); Srinivasa Anthaygari, Middletown, DE (US); Aastha Pandey, Bear, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/934,862

(22) Filed: Nov. 1, 2024

Related U.S. Application Data

(60) Provisional application No. 63/687,039, filed on Aug. 26, 2024.

(51) Int. Cl.
G06F 16/245 (2019.01)
G06F 16/2453 (2019.01)
G06N 3/042 (2023.01)

(52) U.S. Cl.
CPC ....... G06F 16/24545 (2019.01); G06N 3/042 (2023.01)

(58) Field of Classification Search
CPC ............................................... G06F 16/24545

USPC ......................................................... 707/719
See application file for complete search history.

(56) References Cited

U.S. PATENT DOCUMENTS

| | | | |
|---|---|---|---|
| 2016/0155080 A1* | 6/2016 | Gnanasambandam | ...................... G06Q 10/063112 379/265.03 |
| 2021/0133609 A1* | 5/2021 | Lee | ................... H04N 21/44222 |
| 2023/0078577 A1* | 3/2023 | Sun | ........................... G06F 7/14 707/722 |
| 2024/0143680 A1* | 5/2024 | Cui | ...................... G06F 16/9535 |
| 2024/0211700 A1* | 6/2024 | Matsui | .................... G06F 40/40 |
| 2024/0281671 A1* | 8/2024 | Phokela | ................. G06N 5/022 |
| 2024/0403974 A1* | 12/2024 | Chintaluru | .............. G10L 13/02 |

* cited by examiner

*Primary Examiner* — Baoquoc N To
(74) *Attorney, Agent, or Firm* — GREENBLUM & BERNSTEIN, P.L.C.

(57) ABSTRACT

Various methods and processes, apparatuses or systems, and media for using generative AI models to automatically generate responses to customer requests in an efficient and accurate manner are disclosed. The method includes: receiving a query from a user; analyzing the query to determine a topic that is relevant to the query; publishing the query to a topic queue that corresponds to the determined topic; identifying a generative artificial intelligence (AI) model that is trained by using data that corresponds to the determined topic; submitting the query to the generative AI model; receiving an answer to the first query from the generative AI model; storing the received answer to the query in a semantic memory; and transmitting the answer to the user.

17 Claims, 6 Drawing Sheets

100

300

400

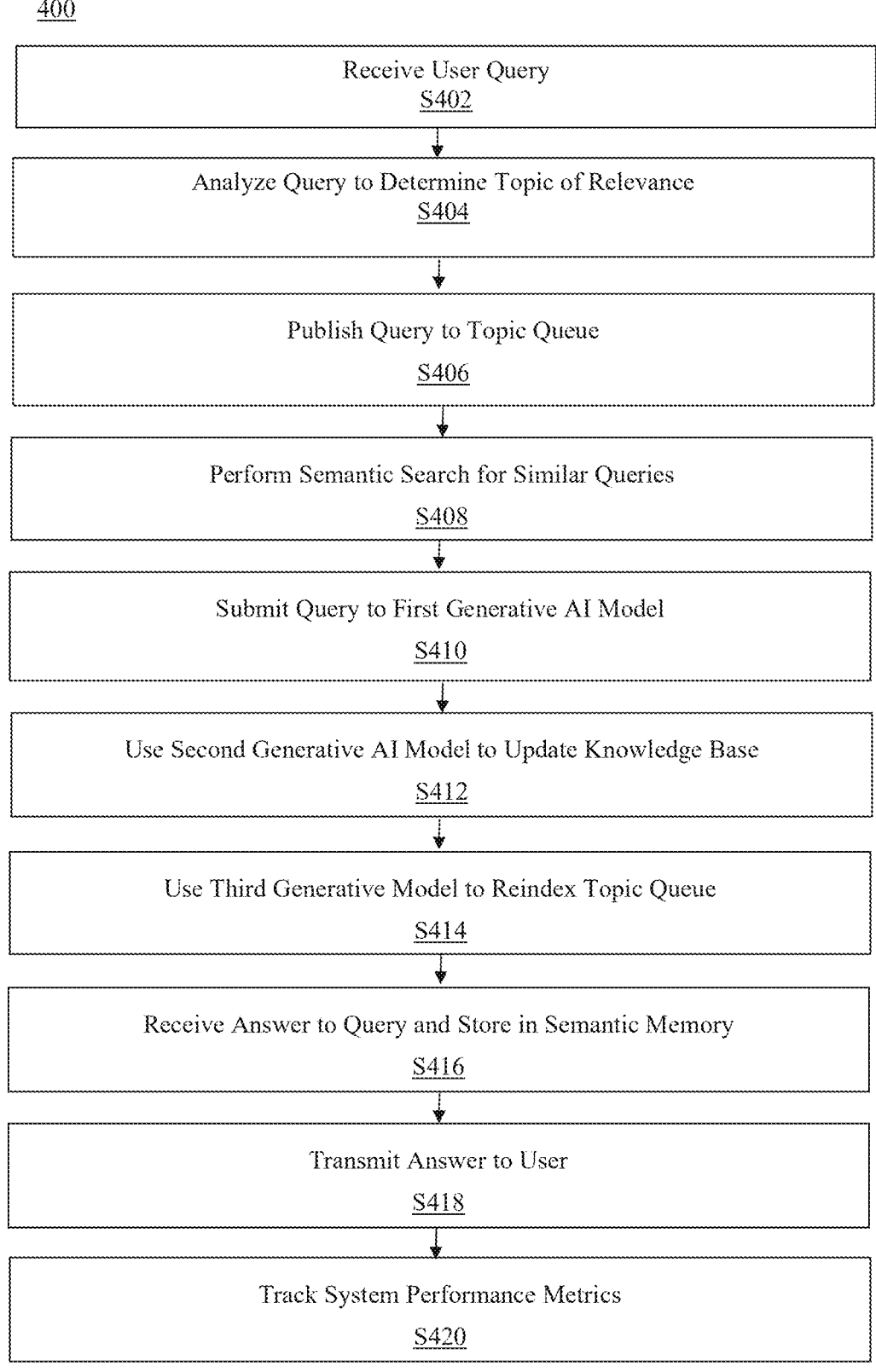

Receive User Query
S402

Analyze Query to Determine Topic of Relevance
S404

Publish Query to Topic Queue
S406

Perform Semantic Search for Similar Queries
S408

Submit Query to First Generative AI Model
S410

Use Second Generative AI Model to Update Knowledge Base
S412

Use Third Generative Model to Reindex Topic Queue
S414

Receive Answer to Query and Store in Semantic Memory
S416

Transmit Answer to User
S418

Track System Performance Metrics
S420

METHOD AND SYSTEM FOR AUTOMATIC RESPONSE TO CUSTOMER REQUESTS USING ARTIFICIAL INTELLIGENCE MODELS

CROSS-REFERENCE TO RELATED APPLICATIONS

This application claims priority benefit from U.S. Provisional Application No. 63/687,039, filed on Aug. 26, 2024 in the U.S Patent and Trademark Office, which is hereby incorporated by reference in its entirety.

TECHNICAL FIELD

This disclosure relates to methods and apparatuses for using generative artificial intelligence models to automatically generate responses to customer requests in an efficient and accurate manner.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

In today's rapidly evolving business landscape, enterprises require efficient and cost-effective solutions for the challenge of managing and retrieving knowledge across multiple domains in order to provide accurate and timely responses to customer requests. Conventionally, providing such responses to customer requests has been performed manually by individuals or teams that are knowledgeable about certain types of subject matter and/or how to find information that is responsive to such requests. In this aspect, a scalable and intelligent system for handling customer requests by using generative artificial intelligence (AI) models to automatically generate such responses may improve accuracy and cost-effectiveness by mitigating the time and costs associated with performing such tasks manually and also by significantly reducing the likelihood of human error.

In addition, a scalable and intelligent system for handling customer requests by using AI models to automatically generate such responses may reduce unnecessary usage of system resources, such as memory capacity and system throughput, which may otherwise be required by search and retrieval processes employed by human specialists. In addition, such a system may also improve computer functionality by advantageously leveraging the use of multiple AI models that are independently trained by using data sets that are customized for specific areas of expertise.

Accordingly, there is a need for a mechanism for using generative AI models to automatically generate responses to customer requests in an efficient and accurate manner.

SUMMARY

The present disclosure, through one or more of its various aspects, embodiments, and/or specific features or sub-components, provides, among other features, various systems, servers, devices, methods, media, programs, and platforms for using generative AI models to automatically generate responses to customer requests in an efficient and accurate manner.

According to an aspect of the present disclosure, a method for generating a response to a query is provided. The method may be implemented by at least one processor. The method may include: receiving, from a user, a first query; analyzing the first query to determine a topic that is relevant to the first query; publishing the first query to a topic queue that corresponds to the determined topic; identifying a first generative artificial intelligence (AI) model that is trained by using data that corresponds to the determined topic; submitting the first query to the first generative AI model; receiving, from the first generative AI model, an answer to the first query; storing the received answer to the first query in a semantic memory; and transmitting, to the user, the received answer to the first query.

The first generative AI model may be configured to have access to an updatable knowledge base, such that when the first generative AI model is not immediately able to generate an answer to the first query, the method may further include: forwarding the first query to a second generative AI model that is configured to update the knowledge base and to retrieve newly obtainable data; and using the first generative AI model to access the updated knowledge base in order to generate the answer to the first query.

The second generative AI model may be configured to retrieve the newly obtainable data from at least one from among an internet source, a document repository, and a database.

The topic queue may include a distributed messaging queue that includes a plurality of topic agents within which each respective topic agent corresponds to a different respective topic of interest.

The method may further include: after the knowledge base has been updated, using a third generative AI model to initiate a re-indexing of the semantic memory within the plurality of topic agents based on the updated knowledge base.

The method may further include performing a semantic search of the semantic memory to determine whether a query that is similar to the first query has previously been answered.

The semantic memory may be structured as a vector space in which each of a plurality of question-answer pairs is embedded using Sentence Transformers and stored.

The method may further include tracking at least one from among a request latency metric that relates to an amount of elapsed time between the receiving of the first query and the transmitting of the answer to the first query, a query cost metric that relates to a cost that is incurred between the receiving of the first query and the transmitting of the answer to the first query, and a semantic memory hit rate metric that relates to a percentage of received queries that are answerable by using the semantic memory without requiring submission to the first generative AI model.

According to another embodiment, a computing apparatus for generating a response to a query is provided. The computing apparatus includes a processor; a semantic memory; and a communication interface coupled to each of the processor and the memory. The processor may be configured to: receive, from a user via the communication interface, a first query; analyze the first query to determine a topic that is relevant to the first query; publish the first query to a topic queue that corresponds to the determined topic; identify a first generative artificial intelligence (AI) model that is trained by using data that corresponds to the determined topic; submit the first query to the first generative AI model; receive, from the first generative AI model, an answer to the first query; store the received answer to the first query in the semantic memory; and transmit, to the user via the communication interface, the received answer to the first query.

The first generative AI model may be configured to have access to an updatable knowledge base, such that when the first generative AI model is not immediately able to generate an answer to the first query, the processor may be further configured to: forward the first query to a second generative AI model that is configured to update the knowledge base and to retrieve newly obtainable data; and use the first generative AI model to access the updated knowledge base in order to generate the answer to the first query.

The second generative AI model may be configured to retrieve the newly obtainable data from at least one from among an internet source, a document repository, and a database.

The topic queue may include a distributed messaging queue that includes a plurality of topic agents within which each respective topic agent corresponds to a different respective topic of interest.

The processor may be further configured to: after the knowledge base has been updated, use a third generative AI model to initiate a re-indexing of the semantic memory within the plurality of topic agents based on the updated knowledge base.

The processor may be further configured to perform a semantic search of the semantic memory to determine whether a query that is similar to the first query has previously been answered.

The semantic memory may be structured as a vector space in which each of a plurality of question-answer pairs is embedded using Sentence Transformers and stored.

The processor may be further configured to track at least one from among a request latency metric that relates to an amount of elapsed time between the receiving of the first query and the transmitting of the answer to the first query, a query cost metric that relates to a cost that is incurred between the receiving of the first query and the transmitting of the answer to the first query, and a semantic memory hit rate metric that relates to a percentage of received queries that are answerable by using the semantic memory without requiring submission to the first generative AI model.

According to yet another embodiment, a non-transitory computer readable storage medium storing instructions for generating a response to a query is provided. The storage medium includes a set of executable code which, when executed by a processor, may cause the processor to: receive, from a user, a first query; analyze the first query to determine a topic that is relevant to the first query; publish the first query to a topic queue that corresponds to the determined topic; identify a first generative artificial intelligence (AI) model that is trained by using data that corresponds to the determined topic; submit the first query to the first generative AI model; receive, from the first generative AI model, an answer to the first query; store the received answer to the first query in a semantic memory; and transmit, to the user, the received answer to the first query.

The first generative AI model may be configured to have access to an updatable knowledge base, such that when the first generative AI model is not immediately able to generate an answer to the first query, the executable code may be further configured to cause the processor to: forward the first query to a second generative AI model that is configured to update the knowledge base and to retrieve newly obtainable data; and use the first generative AI model to access the updated knowledge base in order to generate the answer to the first query.

The topic queue may include a distributed messaging queue that includes a plurality of topic agents within which each respective topic agent corresponds to a different respective topic of interest.

The executable code may be further configured to cause the processor to: after the knowledge base has been updated, use a third generative AI model to initiate a re-indexing of the semantic memory within the plurality of topic agents based on the updated knowledge base.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 illustrates a flow chart of a process for using generative AI models to automatically generate responses to customer requests in an efficient and accurate manner, in accordance with an embodiment.

DETAILED DESCRIPTION

Figure 1:
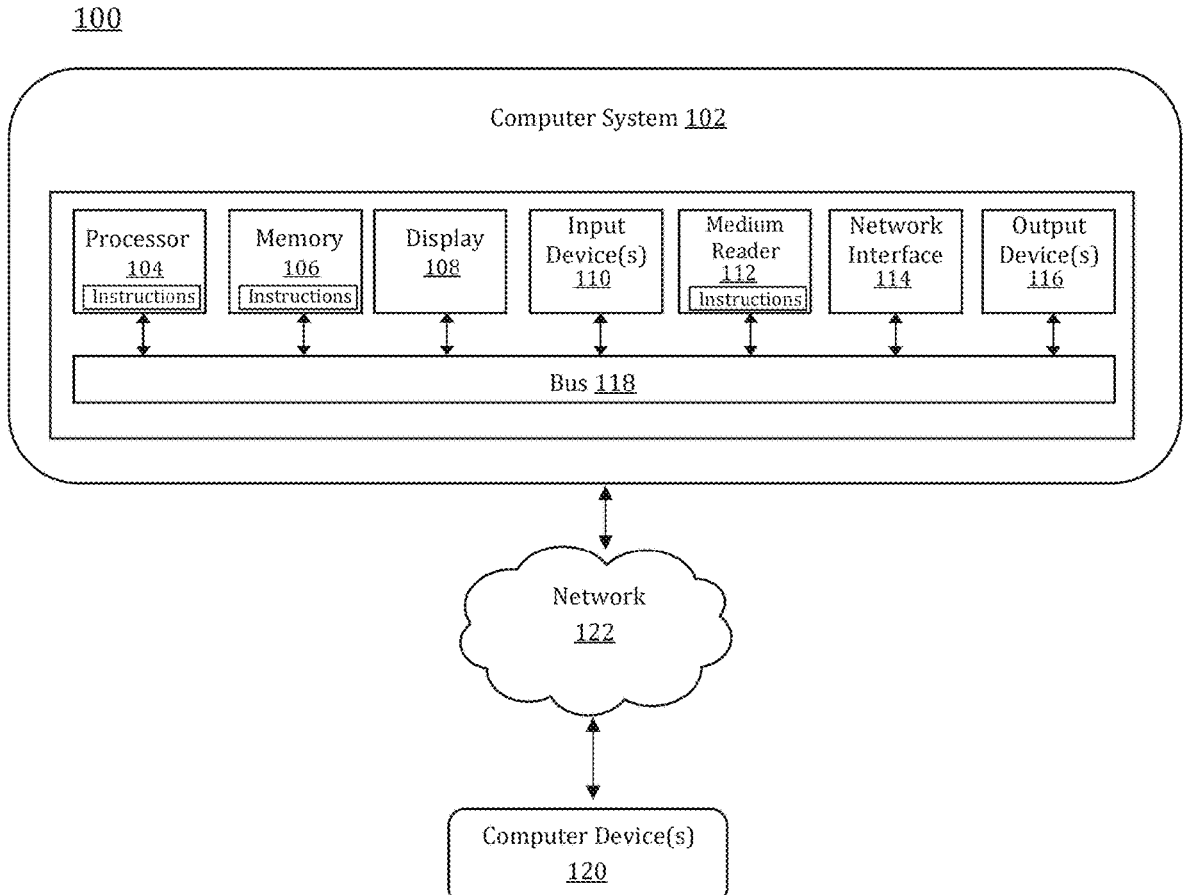
FIG. 1 illustrates a computer system for implementing a method for using generative AI models to automatically generate responses to customer requests in an efficient and accurate manner, in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

As disclosed herein, a system or method for using generative AI models to automatically generate responses to customer requests in an efficient and accurate manner may reduce unnecessary usage of system resources, such as memory capacity and system throughput, which may otherwise be required by search and retrieval processes employed by human specialists. In addition, such a system may also improve computer functionality by advantageously leveraging the use of multiple AI models that are independently trained by using data sets that are customized for specific areas of expertise. In particular, the system or method may achieve these improvements by: receiving, from a user, a first query; analyzing the first query to determine a topic that is relevant to the first query; publishing the first query to a topic queue that corresponds to the determined topic; identifying a first generative artificial intelligence (AI) model that is trained by using data that corresponds to the determined topic; submitting the first query to the first generative AI model; receiving, from the first generative AI model, an answer to the first query; storing the received answer to the first query in a semantic memory; and transmitting, to the user, the received answer to the first query.

FIG. 1 illustrates a system 100 for generating responses to customer requests, in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the modules implemented by the system 100 may be platform, language, database, and cloud agnostic that may allow for consistent easy orchestration and passing of data through various components to output a desired result regardless of platform, browser, language, database, and cloud environment by writing programs accordingly. The configuration or data files, in some embodiments, may be written using JavaScript Object Notation (JSON), but the disclosure is not limited thereto. For example, the configuration or data files may easily be extended to other readable file formats such as Extensible Markup Language (XML), YAML Ain't Markup Language (YAML), etc., or any other configuration-based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
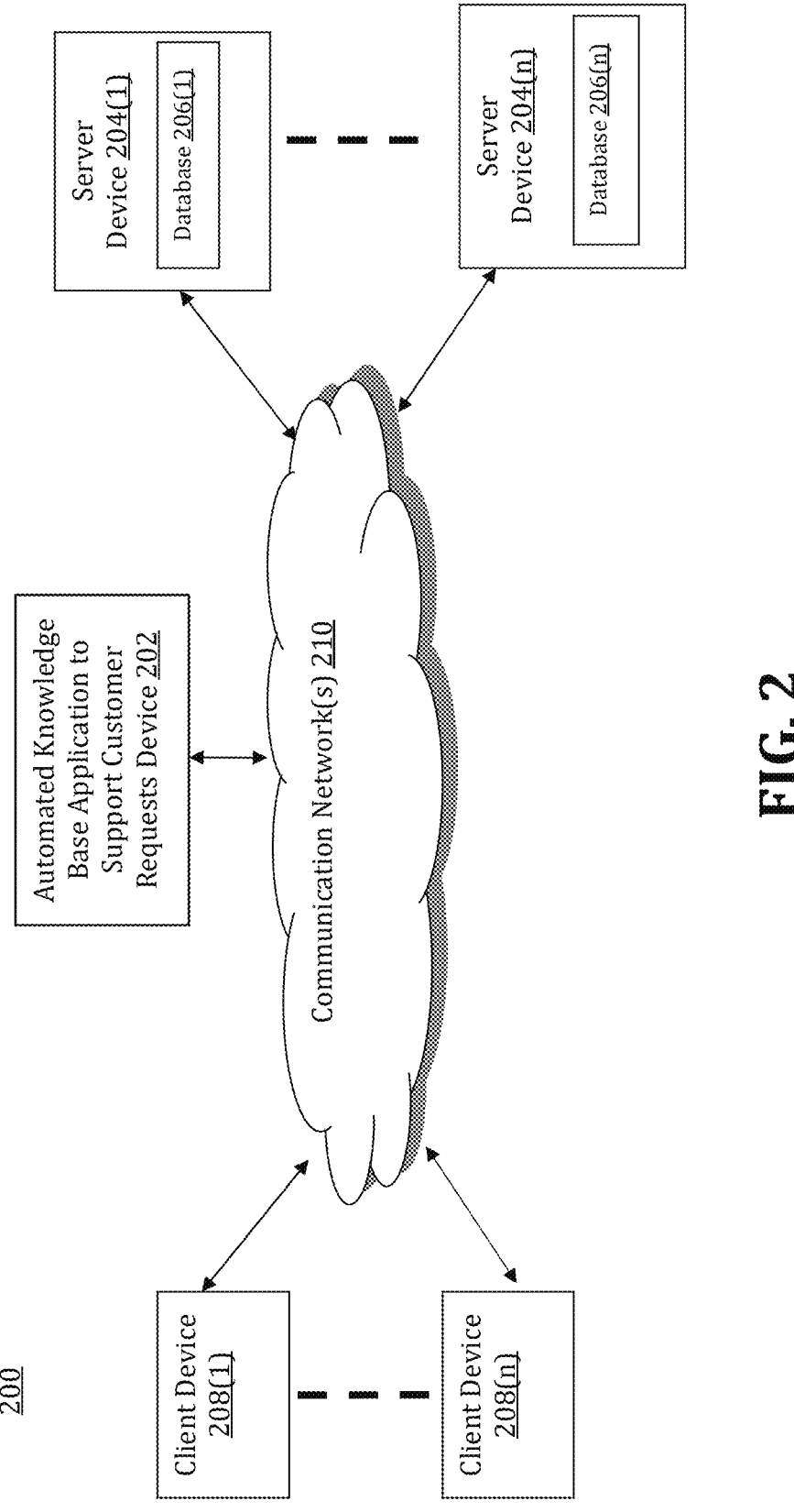
FIG. 2 illustrates a system diagram of a network environment with a device for using generative AI models to automatically generate responses to customer requests in an efficient and accurate manner, in accordance with an embodiment.

Referring to FIG. 2, a schematic of a network environment 200 for implementing an automated knowledge base application to support customer requests device (AKBASCRD) is illustrated.

In some embodiments, the above-described problems associated with conventional tools may be overcome by implementing an AKBASCRD 202 as illustrated in FIG. 2 that may be configured for implementing a method for using generative AI models to automatically generate responses to customer requests in an efficient and accurate manner, but the disclosure is not limited thereto.

The AKBASCRD 202 may have one or more computer system 102s, as described with respect to FIG. 1, which in aggregate provide the necessary functions.

The AKBASCRD 202 may store one or more applications that can include executable instructions that, when executed by the AKBASCRD 202, cause the AKBASCRD 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AKBASCRD 202 itself, may be located in virtual server(s) running in a cloud-based computing environment rather than being tied to one or more specific physical network computing devices. Also, the application(s) may be running in one or more virtual machines (VMs) executing on the AKBASCRD 202. Additionally, in one or more embodiments of this technology, virtual machine(s) running on the AKBASCRD 202 may be managed or supervised by a hypervisor.

In the network environment 200 of FIG. 2, the AKBASCRD 202 is coupled to a plurality of server devices 204(1)-204(n) that hosts a plurality of databases 206(1)-206(n), and also to a plurality of client devices 208(1)-208(n) via communication network(s) 210. A communication interface of the AKBASCRD 202, such as the network interface 114 of the computer system 102 of FIG. 1, operatively couples and communicates between the AKBASCRD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AKBASCRD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AKBASCRD 202 may be a standalone device or integrated with one or more other devices or apparatuses, such as one or more of the server devices 204(1)-204(n), for example. In one particular example, the AKBASCRD 202 may be hosted by one of the server devices 204(1)-204(n), and other arrangements are also possible. Moreover, one or more of the devices of the AKBASCRD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AKBASCRD 202 via the communication network(s) 210 according to the HyperText Transfer Protocol (HTTP)-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store various types of data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

In some embodiments, the client devices 208(1)-208(n) in this example may include any type of computing device that can facilitate the implementation of the AKBASCRD 202 that may efficiently provide a platform for implementing a method for using generative AI models to automatically generate responses to customer requests in an efficient and accurate manner, but the disclosure is not limited thereto.

The client devices 208(1)-208(n) may run interface applications, such as standard web browsers or standalone client applications, which may provide an interface to communicate with the AKBASCRD 202 via the communication network(s) 210 in order to communicate user requests. The client devices 208(1)-208(n) may further include, among other features, a display device, such as a display screen or touchscreen, and/or an input device, such as a keyboard, for example.

Although the network environment 200 with the AKBASCRD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SATRGD 202, the server devices 204(1)-204(n), or the client devices 208(1)-208(n), for example, may be configured to operate as virtual instances on the same physical machine. For example, one or more of the AKBASCRD 202, the server devices 204 (1)-204(n), or the client devices 208(1)-208(n) may operate on the same physical device rather than as separate devices communicating through communication network(s) 210. Additionally, there may be more or fewer AKBASCRDs 202, server devices 204(1)-204(n), or client devices 208(1)- 208(n) than illustrated in FIG. 2. In some embodiments, the AKBASCRD 202 may be configured to send code at runtime to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
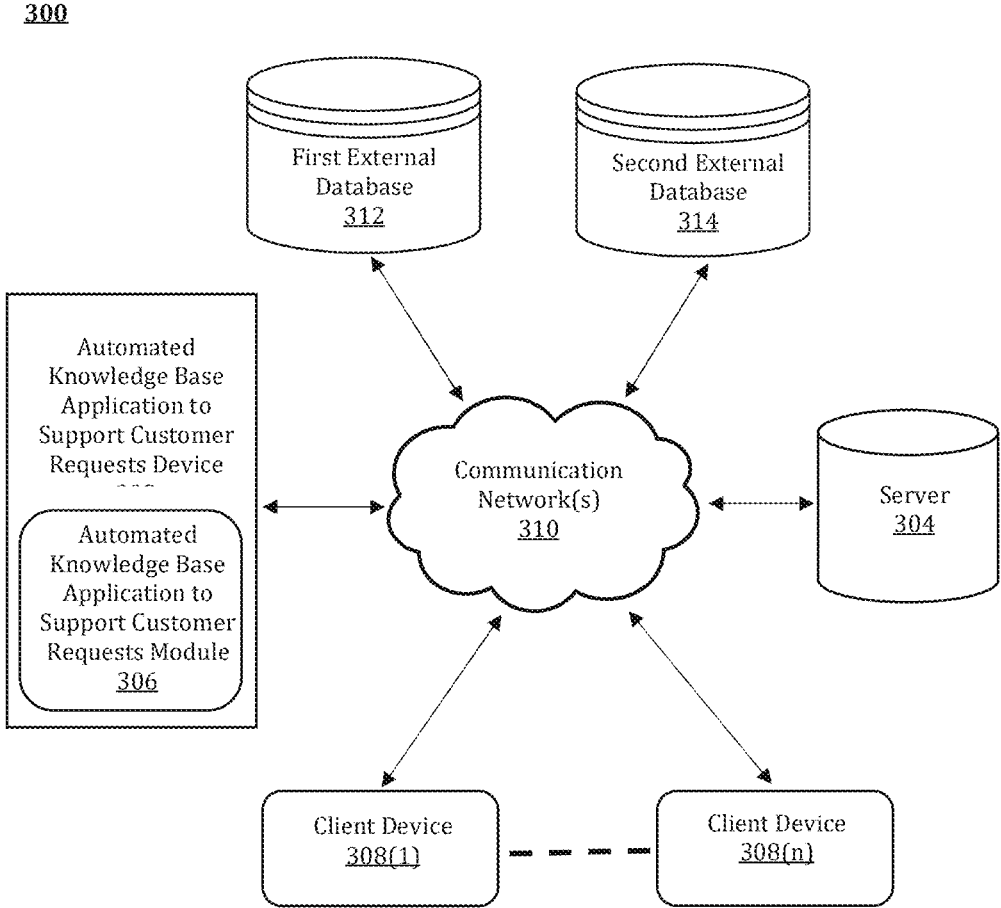
FIG. 3 illustrates a system diagram for implementing a method for using generative AI models to automatically generate responses to customer requests in an efficient and accurate manner, in accordance with an embodiment.

FIG. 3 illustrates a system diagram for implementing an AKBASCRD 302 having an automated knowledge base application to support customer requests module (AKBASCRM), in accordance with an embodiment.

As illustrated in FIG. 3, the system 300 may include an AKBASCRD 302 within which an AKBASCRM 306 is embedded, a server 304, a first external database 312, a second external database 314, a plurality of client devices 308(1) . . . 308(n), and a communication network 310.

In some embodiments, the AKBASCRD 302 including the AKBASCRM 306 may be connected to the server 304, and the database(s) 312 via the communication network 310. The AKBASCRD 302 may also be connected to the plurality of client devices 308(1) . . . 308(n) via the communication network 310, but the disclosure is not limited thereto.

In an embodiment, the AKBASCRD 302 is described and shown in FIG. 3 as including the AKBASCRM 306, although it may include other rules, policies, modules, databases, or applications, for example. In some embodiments, the first external database 312 and/or the second external database 314 may be configured to store ready to use modules written for each application programming interface (API) for all environments. Although only one database is illustrated in FIG. 3, the disclosure is not limited thereto. Any number of desired databases may be utilized for use in the disclosed invention herein. The databases 312, 314 may be a mainframe database, a log database that may produce programming for searching, monitoring, and analyzing machine-generated data via a web interface, etc., but the disclosure is not limited thereto.

In some embodiments, the AKBASCRM 306 may be configured to receive real-time feed of data from the plurality of client devices 308(1) . . . 308(n) and secondary sources via the communication network 310.

As may be described below, the AKBASCRM 306 may be configured to: receive, from a user, a first query; analyze the first query to determine a topic that is relevant to the first query; publish the first query to a topic queue that corresponds to the determined topic; identify a first generative artificial intelligence (AI) model that is trained by using data that corresponds to the determined topic; submit the first query to the first generative AI model; receive, from the first generative AI model, an answer to the first query; store the received answer to the first query in a semantic memory; and transmit, to the user, the received answer to the first query, but the disclosure is not limited thereto.

The plurality of client devices 308(1) . . . 308(n) are illustrated as being in communication with the AKBASCRD 302. In this regard, the plurality of client devices 308(1) . . . 308(n) may be "clients" (e.g., customers) of the AKBASCRD 302 and are described herein as such. Nevertheless, it is to be known and understood that the plurality of client devices 308(1) . . . 308(n) need not necessarily be "clients" of the AKBASCRD 302, or any entity described in association therewith herein. Any additional or alternative relationship may exist between either or both of the plurality of client devices 308(1) . . . 308(n) and the AKBASCRD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(n) may communicate with the AKBASCRD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The AKBASCRD 302 may be the same or similar to the AKBASCRD 202 as described with respect to FIG. 2, including any features or combination of features described with respect thereto.

FIG. 4 illustrates a flow chart of a process 400 that may be implemented by the AKBASCRM 306 of FIG. 3 for enablement of a system and a method for using generative AI models to automatically generate responses to customer requests in an efficient and accurate manner, in accordance with an embodiment. It may be appreciated that the illustrated process 400 and associated steps may be performed in a different order, with illustrated steps omitted, with additional steps added, or with a combination of reordered, combined, omitted, or additional steps.

As illustrated in FIG. 4, at step S402, the process 400 may include receiving a query from a user. In an embodiment, the user may be a customer of a commercial enterprise, such as, for example, a financial institution such as a bank, and the query may relate to a business interaction between the user and the commercial enterprise, such as, for example, an inquiry that relates to an account associated with the user and/or a transaction that has previously been executed or is planned to be executed by the user. Alternatively, the query may relate to a generic topic such as geography, literature, history, current events, sports, health and/or medicine, and/or any other topic for which a user may wish to learn information.

At step S404, the process 400 may include analyzing the query to determine a topic that is relevant to the current query, i.e., the query received in step S402. In an embodiment, the analysis may be performed by using a Natural Language Processing (NLP) technique to parse textual information that is included in the query in order to determine one or more topics that are relevant to the query.

At step S406, the process 400 may include publishing the current query to a topic queue that corresponds to the topic of relevance as determined in step S404. In an embodiment, the topic queue may include a distributed messaging queue that includes a plurality of topic agents within which each respective topic agent corresponds to a different respective topic of interest. In this aspect, the AKBASCRM 306 may be configured to use the topic of relevance as determined in step S404 to select one or more of the topic agents as being suitable for handling the query, and to route the query to the selected topic agent(s).

At step S408, the process 400 may include performing a semantic search within a respective semantic memory of each corresponding topic agent to determine whether the current query is similar to a query that has previously been received and answered and then stored in the respective semantic memory. In an embodiment, each respective semantic memory may be structured as a vector space within which question-answer pairs may be embedded by using a predetermined embedding technique, such as, for example, a Sentence Transformers algorithm. In an embodiment, when a determination is made that the current query is similar to a previously received query, the AKBASCRM 306 may be configured to determine that the answer to the previously received query serves as an accurate answer to the current query, and the process 400 may then skip ahead to step S418, i.e., transmitting the answer to the user.

At step S410, when a determination is made that the current query is not similar to previously received queries, the process 400 may include submitting the current query to a first generative AI model that is trained by using data that corresponds to the topic of relevance as determined in step S404. In an embodiment, the first generative AI model may include a Large Language Model (LLM) that is trained on a wide variety of topics. In an embodiment, when the first generative AI model is immediately able to generate an answer to the current query, the process 400 may then skip ahead to step S416, i.e., receiving the answer to the query.

At step S412, when the first generative AI model is not immediately able to generate an answer to the current query, the process 400 may include using a second generative AI model to update a knowledge base. In an embodiment, the second generative AI model may be configured to retrieve newly obtainable data from a variety of sources, such as, for example, the internet, a document repository, and a set of databases. In an embodiment, when the newly obtainable data has been retrieved by the second generative AI model, the knowledge base may be updated with the retrieved data, and the first generative AI model may be configured to access the updated knowledge base in order to generate an answer to the current query.

At step S414, the process 400 may include using a third generative AI model to initiate a re-indexing of the semantic memories included in the plurality of topic agents based on the updated knowledge base. In an embodiment, the updating of the knowledge base and the re-indexing of the semantic memories may be performed on a regular basis, such as a periodic basis, in order to ensure that the knowledge base remains current and that the first generative AI model is able to generate accurate and contextually relevant answers to queries based on the latest knowledge.

At step S416, the process 400 may include receiving an answer to the current query from the first generative AI model and storing the received answer, together with the current query, as a question-answer pair in a respective semantic memory that corresponds to the respective topic agent selected in step S406 as being suitable for handling the current query.

At step S418, the process 400 may include transmitting the answer to the current query to the user from whom the current query was originally received. In an embodiment, the transmission of the answer may be performed by transmitting the answer to a user workstation that displays a user interface (UI) that is visible by the user, so that the user can see the answer to the current query on a screen of the user workstation.

In an embodiment, at step S420, the AKBASCRM 306 may be further configured to track various metrics that provide respective indications as to a performance quality of the AKBASCRM 306. For example, the AKBASCRM 306 may be configured to track any one or more of a request latency metric that relates to an amount of elapsed time between the receiving of the current query and the transmitting of the answer to the current query; a query cost metric that relates to a cost that is incurred between the receiving of the current query and the transmitting of the answer to the current query, and a semantic memory hit rate metric that relates to a percentage of received queries that are answerable by using a respective semantic memory without requiring submission to the first generative AI model.

In today's rapidly evolving business landscape, enterprises require efficient and cost-effective solutions to manage and retrieve knowledge across multiple domains. In an embodiment, a low-cost automated knowledge base application is designed to address this need by providing a scalable and intelligent system for handling customer requests. In an embodiment, the system integrates advanced technologies, including a Large Language Model (LLM), a Retrieval-Augmented Generation (RAG) agent, and automatic knowledge updates through the RAG agent and a Reindex RAG (ReRAG) agent, to ensure that the knowledge base is always current and relevant.

In an embodiment, a user may interact with the system through a dedicated user interface (UI) or plugins within popular development environments such as IntelliJ and Visual Studio Code (VSCode), thereby allowing seamless integration into their workflows.

Figure 5:
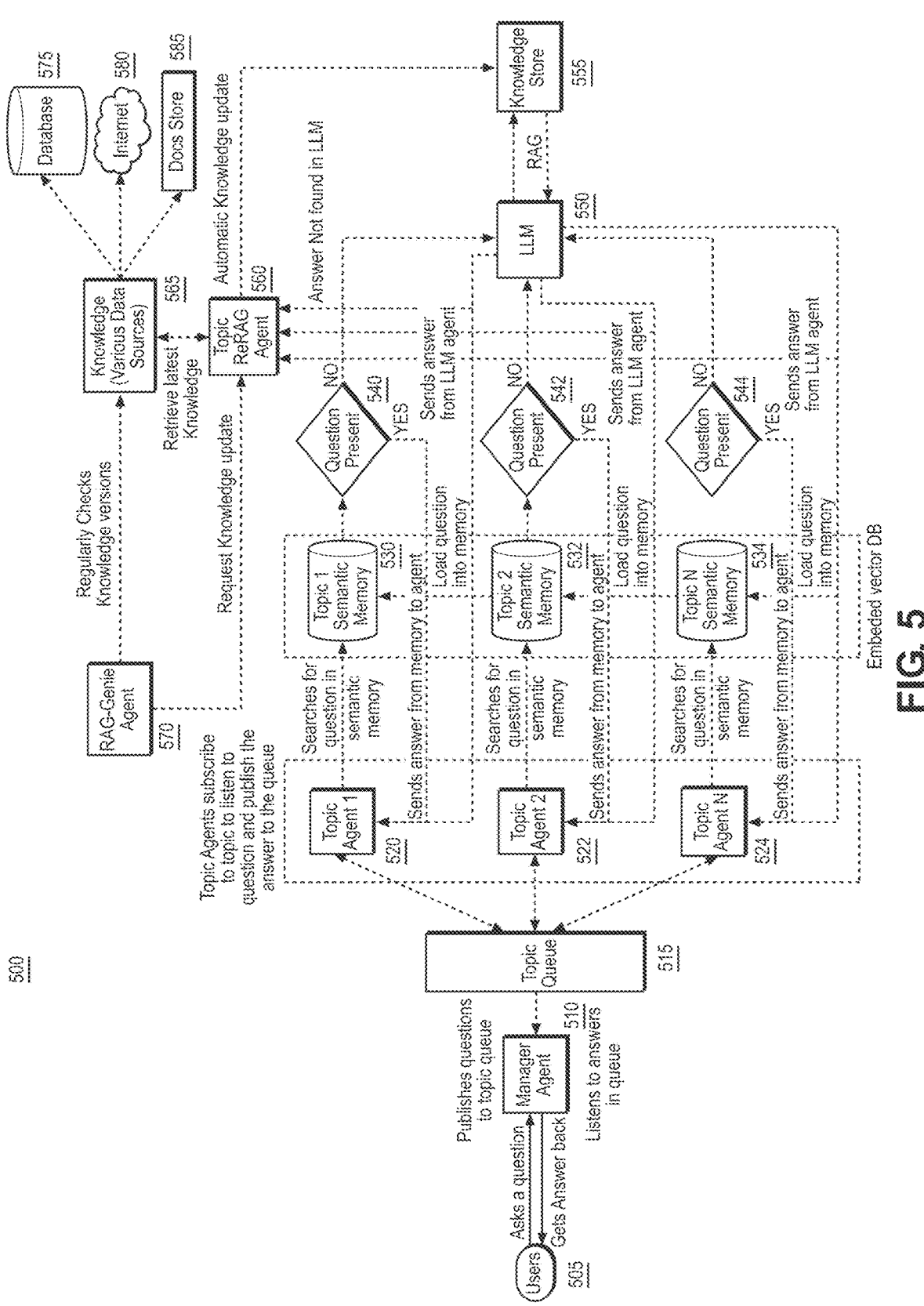
FIG. 5 illustrates an architecture diagram of a system for using generative AI models to automatically generate responses to customer requests in an efficient and accurate manner, in accordance with an embodiment.

FIG. 5 illustrates an architecture diagram of a system 500 that may be configured to generate responses to customer requests, in accordance with an embodiment. As illustrated in FIG. 5, the system 500 may be centered around a distributed messaging queue, with different agents subscribing to specific topics of interest. The architecture may be designed to provide efficient knowledge retrieval, automatic updates, and cost-effective operation.

The system 500 may include a manager agent 510 that may act as an interface between users 505 and topic queue 515. In an embodiment, the manager agent 510 may be configured to accept queries from users via a UI and/or a software plugin such as IntelliJ or VSCode. Moreover, the manager agent 510 may be configured to publish the queries to a topic queue 515. In addition, the manager agent 510 may also be configured to listen for responses from one or more topic agents such as topic agents 520, 522, and 524. Further still, the manager agent 510 may be configured to return answers to users. In an embodiment, the manager agent 510 may be further configured to track one or more performance metrics, such as, for example, a request latency metric that measures an average time from when a query is submitted to when an answer is delivered. A LLM Query Cost metric that tracks the cumulative cost of LLM queries may be measured. A Semantic Memory Hit Rate metric that monitors a percentage of queries that are resolved using the respective semantic memory of a Topic Agent without invoking the LLM may be tracked.

The system 500 may also include the topic queue 515, which may serve as a communication medium between the manager agent 510 and the topic agents 520, 522, 524. In an embodiment, each topic may have a dedicated queue where questions related to that topic may be published. The topic queue 515 may be configured to receive and hold questions until they are picked up by the subscribing topic agent, and to ensure reliable message delivery between agents. In an embodiment, the topic queue 515 may act as a buffer, thereby ensuring that messages are not lost if a particular topic agent is temporarily unavailable. Persistent storage of semantic memory and counters may ensure that agents are able to recover and continue operations seamlessly after a failure.

The system 500 may also include a set of topic agents, such as, for example, topic agent 1 520, topic agent 2 522, and topic agent N 524. In an embodiment, the topic agents may be specialized agents that are configured to handle questions related to specific domains, such as, for example, geography or literature. Each respective topic agent may be further configured to search for answers in its respective semantic memory, i.e., topic 1 semantic memory 530, topic 2 semantic memory 532, or topic N semantic memory 534, and if the answer is not found (i.e., question present 540, question present 542, or question present 544), then the respective topic agent may forward the query to Large Language Model (LLM) 550. In an embodiment, the topic agents 520, 522, 524 may be configured to subscribe to specific topics in the queue, and to check the respective semantic memory 530, 532, 534 for answers. If a match is found at question present 540, 542, 544, then the answer may be sent back to the response queue; and if no match is found, the LLM 550 may be queried, the answer may be updated in the respective semantic memory 530, 532, 534, and then the answer may be sent to the topic queue 515. In an embodiment, the distributed nature of the topic agents 520, 522, 524 and the decoupling provided by the topic queue 515 allow the system 500 to scale horizontally. New topic agents may be added dynamically to handle additional domains or increased load.

The system 500 may also include the LLM 550. In an embodiment, the LLM 550 may be configured to provide answers when the respective topic agent's semantic memory does not have the required information. In this aspect, the LLM 550 may be configured to act as a central component for generating responses to complex queries. In an embodiment, the LLM 550 may be further configured to receive queries from the topic agents 520, 522, 524; and to process the queries by using a trained model of the LLM 550, and then to return the answers to the queries to the topic agents 520, 522, 524. In an embodiment, the manager agent 510 may be further configured to monitor a semantic memory hit rate metric that tracks a percentage of queries that are resolved by using the respective semantic memory of a topic agent without invoking the LLM 550. The manager agent 510 may be further configured to monitor an LLM query cost metric that tracks the cumulative cost of LLM queries.

The system 500 may also include a retrieval-augmented generation (RAG) genie agent 570. In an embodiment, the RAG genie agent 570 may be responsible for the continuous enrichment and augmentation of a knowledge store 555 upon which the LLM 550 relies. In this aspect, the RAG genie agent 570 may be configured to ensure that the LLM 550 has access to the most relevant and up-to-date information. In an embodiment, the RAG genie agent 570 may be further configured to regularly retrieve the latest knowledge from various data sources, including databases 575, internet sources 580, and document stores 585, and to automatically update a knowledge base 565 with the retrieved information. In this manner, the RAG genie agent may be configured to ensure that the LLM 550 is able to generate accurate and contextually relevant answers based on the latest knowledge.

The system 500 may also include a topic reRAG agent 560. In an embodiment, the topic reRAG agent 560 may be configured to work in tandem with the RAG genie agent 570 to update and re-index the knowledge base 565 and the knowledge store 555 used by the LLM 550 and the topic agents 520, 522, 524. The topic reRAG agent 560 may be configured to maintain an accuracy and a relevance of the system 500 over time. In an embodiment, the topic reRAG agent 560 may be further configured to monitor for updates in the knowledge base 565, and to trigger re-indexing of the respective semantic memory 530, 532, 534 within each of the topic agents 520; 522, 524. In an embodiment, the topic reRAG agent may be further configured to ensure that the LLM 550 and the topic agents 520, 522, 524 are utilizing the latest available knowledge by automatically updating the knowledge store 555, and to facilitate a dynamic adaptation of the system to new information, thereby minimizing the risk of outdated or incorrect responses.

The system 500 may also include the knowledge store 555. In an embodiment, the knowledge store 555 may be configured to act as a repository for the knowledge used by the LLM 550. In an embodiment, the knowledge store 555 may be configured to be dynamically updated by the RAG genie agent 570 and the topic reRAG agent 560 in order to ensure that the system 500 remains current. In an embodiment, the knowledge store 555 may be further configured to store and manage the comprehensive knowledge base, and to provide knowledge updates to the LLM 550 as orchestrated by the RAG genie agent 570 and the topic reRAG agent 560. In an embodiment, the RAG genie agent 570 may operate autonomously to keep the knowledge store 555 updated without manual intervention. In this aspect, the RAG genie agent 570 may significantly reduce the risk of the LLM 550 providing outdated information.

Figure 6:
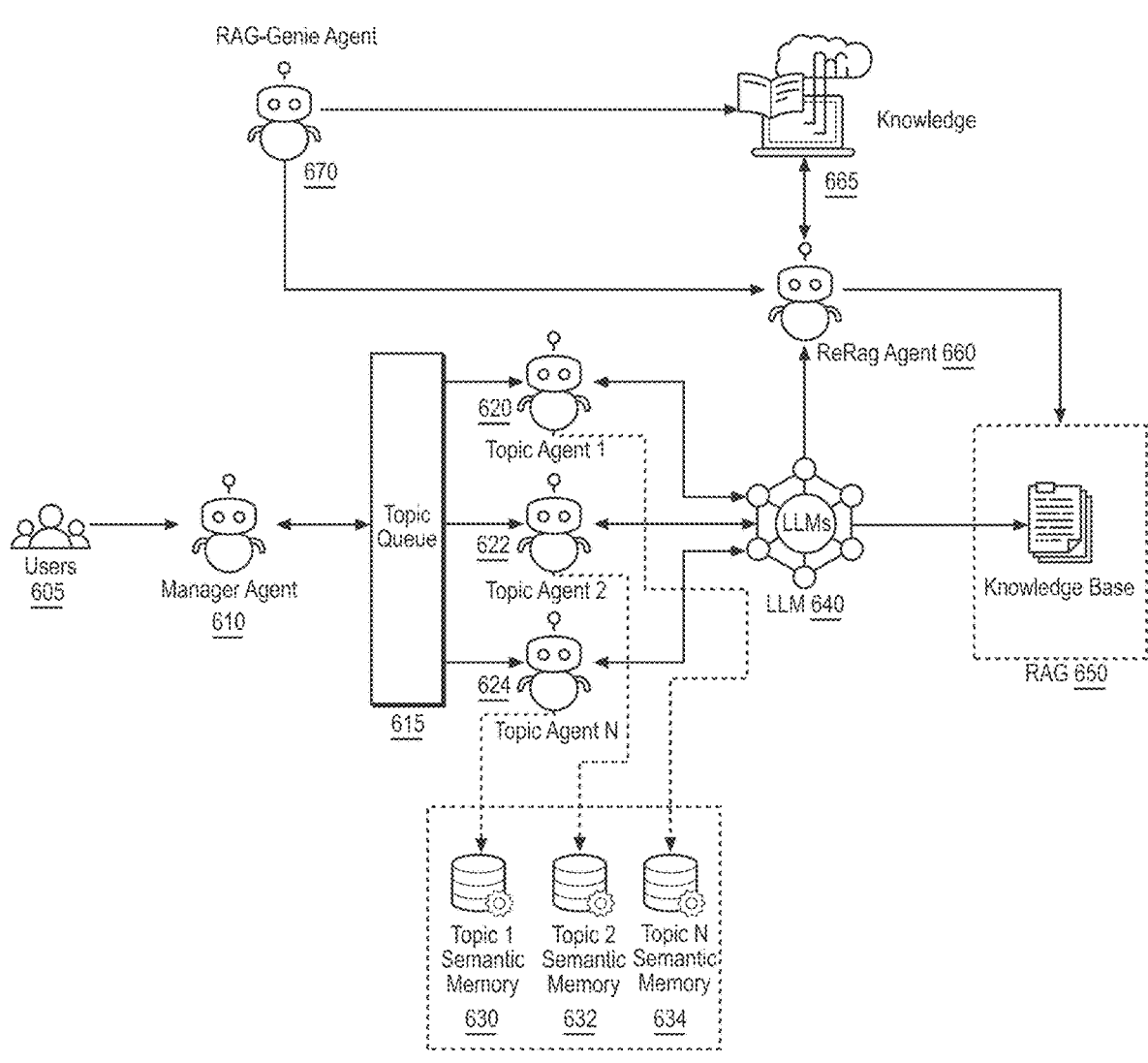
FIG. 6 illustrates a message queue architecture diagram that shows a data flow in a system for using generative AI models to automatically generate responses to customer requests in an efficient and accurate manner, in accordance with an embodiment.

FIG. 6 illustrates a message queue architecture diagram 600 that shows a data flow in a system configured to generate responses to customer requests, in accordance with an embodiment.

Referring to FIG. 6, a flow of operations may include a user query submission step by which a user 605 may submit a query to the system through a manager agent 610 using a UI or a plugin within IntelliJ or VSCode. The flow of operations may further include a question publishing step by which the manager agent 610 may determine the relevant topic for the query and may publish the query to the corresponding topic queue 615. The flow of operations may further include a topic agent processing step by which a respective topic agent 620, 622, 624 that is subscribed to the queue may pick up the query, and then may check its respective semantic memory 630, 632, 634 for a match. In an embodiment, if a match is found, then an answer may be published to the topic queue 615; and if no match is found, then the respective topic agent 620, 622, 624 may query the LLM 640, may store the answer in its respective semantic memory 630, 632, 634, and may publish the answer to the topic queue 615. The flow of operations may further include a response delivery step by which the manager agent 610 may listen for answers on the topic queue 615, and when an answer is received, the answer may be returned to the user 605 through the UI or the development environment plugin. The flow of operations may further include a knowledge base update step by which the RAG genie agent 670 may continuously update a knowledge module 665 and a knowledge base 650. In an embodiment, a reRAG agent 660 may monitor these updates and may trigger re-indexing within the topic agents 620, 622, 624 and the LLM 640, thereby ensuring that the system always uses the most up-to-date information.

The message queue architecture 600 may be implemented by using a distributed message broker such as Redis. The use of a distributed message broker may provide a decoupling between the manager agent 610, which may act as a producer, and the topic agents 620, 622, 624, which may act as consumers, thereby enabling scalability and fault tolerance.

In some embodiments, each topic agent 620, 622, 624 may be designed to focus on a specific knowledge domain. The agents may be configured to perform a semantic search through local memory and LLM 640 capabilities for complex queries.

In an embodiment, Facebook AI Similarity Search (FAISS) provides a library that may be used for quick retrieval of semantically similar entries from each respective semantic memory 630, 632, 634. Each respective semantic memory 630, 632, 634 may be structured as a vector space within which each question-answer pair is embedded and stored. In an embodiment, the embedding may be performed by using a predetermined embedding technique, such as, for example, Sentence Transformers.

In an embodiment, one or more of the topic agents 620, 622, 624 may be configured to perform a memory addition operation by which new question-answer pairs are encoded and added to the memory index of the corresponding semantic memory 630, 632, 634. In an embodiment, one or more of the topic agents 620, 622, 624 may be further configured to perform a memory search operation by which incoming questions are encoded and matched against the stored embeddings to find similar questions and their answers.

In an embodiment, the topic agents 620, 622, 624 may resolve a significant portion of queries without needing to query the LLM 640 by leveraging the corresponding semantic memory 630, 632, 634. In turn, this may reduce the number of LLM invocations, thereby leading to cost savings. In an embodiment, when the hit rate of the respective semantic memory 630, 632, 634 is higher, the number of times that the LLM 640 is queried is correspondingly fewer, which directly correlates to lower operational costs. In environments with repetitive queries or well-established knowledge, the respective semantic memory 630, 632, 634 may be able to handle a majority of requests.

In an embodiment, when the respective semantic memory 630, 632, 634 does not have an answer to a particular query, the respective topic agent 620, 622, 624 may be configured to forward the particular query to the LLM 640. In an embodiment, each query to the LLM 640 may incur a cost, which may be tracked cumulatively for monitoring purposes. By prioritizing semantic memory retrieval, the system may minimize these costs while still providing accurate answers when necessary.

In some embodiments as disclosed above in FIGS. 1-6, technical improvements effected by the instant disclosure may include a platform for implementing an automated knowledge base application to support customer requests module configured for enablement of using generative AI models to automatically generate responses to customer requests in an efficient and accurate manner, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a response to a query, the method being implemented by at least one processor, the method comprising:
   receiving, from a user, a first query;
   analyzing the first query to determine a topic that is relevant to the first query;
   publishing the first query to a topic queue that corresponds to the determined topic;
   identifying a first generative artificial intelligence (AI) model that is configured to handle questions related to a first specific domain and that is trained by using data that corresponds to the determined topic;
   submitting the first query to the first generative AI model;
   receiving, from the first generative AI model, an answer to the first query;
   storing the received answer to the first query in a semantic memory; and
   transmitting, to the user, the received answer to the first query,
   wherein the first generative AI model is configured to have access to an updatable knowledge base, such that when the first generative AI model is not immediately able to generate an answer to the first query, the method further comprises:
   forwarding the first query to a second generative AI model that is configured to handle questions related to a second specific domain and to update the knowledge base and to retrieve newly obtainable data; and
   using the first generative AI model to access the updated knowledge base in order to generate the answer to the first query.

2. The method of claim 1, wherein the second generative AI model is configured to retrieve the newly obtainable data from at least one from among an internet source, a document repository, and a database.

3. The method of claim 1, wherein the topic queue comprises a distributed messaging queue that includes a plurality of topic agents within which each respective topic agent corresponds to a different respective topic of interest.

4. The method of claim 3, further comprising: after the knowledge base has been updated, using a third generative AI model to initiate a re-indexing of the semantic memory within the plurality of topic agents based on the updated knowledge base.

5. The method of claim 1, further comprising performing a semantic search of the semantic memory to determine whether a query that is similar to the first query has previously been answered.

6. The method of claim 5, wherein the semantic memory is structured as a vector space in which each of a plurality of question-answer pairs is embedded using Sentence Transformers and stored.

7. The method of claim 1, further comprising tracking at least one from among a request latency metric that relates to an amount of elapsed time between the receiving of the first query and the transmitting of the answer to the first query and a semantic memory hit rate metric that relates to a percentage of received queries that are answerable by using the semantic memory without requiring submission to the first generative AI model.

8. A computing apparatus for generating a response to a query, the computing apparatus comprising:
   a processor;
   a semantic memory; and
   a communication interface coupled to each of the processor and the memory, wherein the processor is configured to:

receive, from a user via the communication interface, a first query;

analyze the first query to determine a topic that is relevant to the first query;

publish the first query to a topic queue that corresponds to the determined topic;

identify a first generative artificial intelligence (AI) model that is configured to handle questions related to a first specific domain and that is trained by using data that corresponds to the determined topic;

submit the first query to the first generative AI model;

receive, from the first generative AI model, an answer to the first query;

store the received answer to the first query in the semantic memory; and transmit, to the user via the communication interface, the received answer to the first query, wherein the first generative AI model is configured to have access to an updatable knowledge base, such that when the first generative AI model is not immediately able to generate an answer to the first query, the processor is further configured to:

forward the first query to a second generative AI model that is configured to handle questions related to a second specific domain and to update the knowledge base and to retrieve newly obtainable data; and use the first generative AI model to access the updated knowledge base in order to generate the answer to the first query.

9. The computing apparatus of claim 8, wherein the second generative AI model is configured to retrieve the newly obtainable data from at least one from among an internet source, a document repository, and a database.

10. The computing apparatus of claim 8, wherein the topic queue comprises a distributed messaging queue that includes a plurality of topic agents within which each respective topic agent corresponds to a different respective topic of interest.

11. The computing apparatus of claim 10, wherein the processor is further configured to: after the knowledge base has been updated, use a third generative AI model to initiate a re-indexing of the semantic memory within the plurality of topic agents based on the updated knowledge base.

12. The computing apparatus of claim 8, wherein the processor is further configured to perform a semantic search of the semantic memory to determine whether a query that is similar to the first query has previously been answered.

13. The computing apparatus of claim 12, wherein the semantic memory is structured as a vector space in which each of a plurality of question-answer pairs is embedded using Sentence Transformers and stored.

14. The computing apparatus of claim 8, wherein the processor is further configured to track at least one from among a request latency metric that relates to an amount of elapsed time between the receiving of the first query and the transmitting of the answer to the first query and a semantic memory hit rate metric that relates to a percentage of received queries that are answerable by using the semantic memory without requiring submission to the first generative AI model.

15. A non-transitory computer readable storage medium storing instructions for generating a response to a query, the storage medium comprising executable code which, when executed by a processor, causes the processor to:

receive, from a user, a first query;

analyze the first query to determine a topic that is relevant to the first query;

publish the first query to a topic queue that corresponds to the determined topic;

identify a first generative artificial intelligence (AI) model that is configured to handle questions related to a first specific domain and that is trained by using data that corresponds to the determined topic;

submit the first query to the first generative AI model;

receive, from the first generative AI model, an answer to the first query;

store the received answer to the first query in a semantic memory; and transmit, to the user, the received answer to the first query, wherein the first generative AI model is configured to have access to an updatable knowledge base, such that when the first generative AI model is not immediately able to generate an answer to the first query, the executable code is further configured to cause the processor to:

forward the first query to a second generative AI model that is configured to handle questions related to a second specific domain and to update the knowledge base and to retrieve newly obtainable data; and use the first generative AI model to access the updated knowledge base in order to generate the answer to the first query.

16. The storage medium of claim 15, wherein the topic queue comprises a distributed messaging queue that includes a plurality of topic agents within which each respective topic agent corresponds to a different respective topic of interest.

17. The storage medium of claim 16, wherein the executable code is further configured to cause the processor to: after the knowledge base has been updated, use a third generative AI model to initiate a re-indexing of the semantic memory within the plurality of topic agents based on the updated knowledge base.

* * * * *